United States Patent
Harms et al.

(10) Patent No.: US 12,037,200 B2
(45) Date of Patent: Jul. 16, 2024

(54) LATCH STATE DETECTION SYSTEMS AND METHODS

(71) Applicant: GOODRICH CORPORATION, Charlotte, NC (US)

(72) Inventors: Scott Harms, Ypsilanti, ND (US); Aaron J. Roberts, Jamestown, ND (US); Mark L. Olson, Jamestown, ND (US)

(73) Assignee: GOODRICH CORPORATION, Charlotte, NC (US)

(*) Notice: Subject to any disclaimer, the term of this patent is extended or adjusted under 35 U.S.C. 154(b) by 424 days.

(21) Appl. No.: 17/397,569

(22) Filed: Aug. 9, 2021

(65) Prior Publication Data
US 2023/0038242 A1 Feb. 9, 2023

(51) Int. Cl.
*B65G 43/00* (2006.01)
*G06V 20/10* (2022.01)

(52) U.S. Cl.
CPC ............. *B65G 43/00* (2013.01); *G06V 20/10* (2022.01); *B65G 2203/02* (2013.01); *B65G 2203/041* (2013.01)

(58) Field of Classification Search
None
See application file for complete search history.

(56) References Cited

U.S. PATENT DOCUMENTS

| | | | | |
|---|---|---|---|---|
| 6,448,907 B1* | 9/2002 | Naclerio | ............ | B64D 45/0059 280/801.1 |
| 6,888,475 B2* | 5/2005 | Darr | ................... | B64D 45/0044 340/438 |
| 7,003,374 B2* | 2/2006 | Olin | ....................... | B64D 9/003 410/77 |
| 7,714,708 B2* | 5/2010 | Brackmann | ............... | B60P 3/14 180/290 |
| 7,972,099 B2* | 7/2011 | Leggett | .................. | B60P 7/0861 410/103 |
| 8,375,530 B2* | 2/2013 | Walega | .................... | B60R 22/32 24/603 |
| 8,515,656 B2* | 8/2013 | Reed | ....................... | G01M 1/125 701/3 |
| 9,022,208 B2* | 5/2015 | Huber | ....................... | B64D 9/00 198/781.05 |
| 9,085,364 B2* | 7/2015 | Huber | ....................... | B60P 7/13 |
| 9,145,177 B2* | 9/2015 | Smith | .................. | B62D 35/007 |
| 9,908,625 B2* | 3/2018 | Goyal | ................ | B64D 11/0015 |
| 9,940,730 B2* | 4/2018 | Zhang | ........................ | G06T 7/50 |
| 10,005,564 B1* | 6/2018 | Bhatia | ....................... | B64C 1/20 |
| 10,202,065 B2 | 2/2019 | Koehler | | |

(Continued)

FOREIGN PATENT DOCUMENTS

EP 3401217 11/2018

OTHER PUBLICATIONS

European Patent Office, European Search Report dated Dec. 13, 2022 in Application No. 22189459.5.

*Primary Examiner* — Carlos R Ortiz Rodriguez
(74) *Attorney, Agent, or Firm* — SNELL & WILMER L.L.P.

(57) ABSTRACT

A method may comprise: receiving, via a controller and through a camera, visual data corresponding to a row of latch assemblies in a cargo handling system; and determining, via the controller, whether each latch assembly in the row of latch assemblies is in a properly securing state.

17 Claims, 10 Drawing Sheets

(56) References Cited

U.S. PATENT DOCUMENTS

| | | | |
|---|---|---|---|
| 10,604,339 B2* | 3/2020 | McKay | B65D 90/18 |
| 11,580,484 B2* | 2/2023 | Patnaik | B60P 7/0861 |
| 2010/0100225 A1 | 4/2010 | Reed et al. | |
| 2014/0372183 A1* | 12/2014 | Groble | G06Q 50/28 |
| | | | 705/7.38 |
| 2018/0089622 A1* | 3/2018 | Burch, V | B64U 80/82 |
| 2019/0301899 A1 | 10/2019 | Clos et al. | |
| 2020/0122835 A1 | 4/2020 | Daw Perez et al. | |
| 2020/0140088 A1 | 5/2020 | Harms et al. | |
| 2020/0156791 A1* | 5/2020 | Roberts | B65G 43/00 |

* cited by examiner

LATCH STATE DETECTION SYSTEMS AND METHODS

FIELD

The present disclosure relates generally to cargo handling systems and, more particularly, to latch state detection systems and methods for cargo handling systems.

BACKGROUND

Cargo handling systems for aircraft typically include various tracks and rollers disposed on a cargo deck that spans the length of a cargo compartment. Cargo may be loaded from an entrance of the aircraft and transported by the cargo system to forward or aft locations, depending upon the configuration of the aircraft. Cargo handling systems, such as, for example, those used on aircraft for transport of heavy containerized cargo or pallets, also referred to herein as unit load devices (ULDs), typically include restraints to lock the ULDs in the cargo compartment. Typical latches for ULDs are operated manually, which lend themselves to potential user error.

SUMMARY

A method is disclosed herein. The method may comprise: receiving, via a controller and through a camera, visual data corresponding to a row of latch assemblies in a cargo handling system; and determining, via the controller, whether each latch assembly in the row of latch assemblies is in a properly securing state.

In various embodiments, the method may further comprise generating, via the controller, a status of the row of latch assemblies. The status may either be acceptable or unacceptable. The method may further comprise commanding a first latch assembly in the row of latch assemblies to retract and re-deploy in response to determining the first latch assembly is not in the properly securing state. The method may further comprise commanding each latch assembly in the row of latch assemblies to transition from a retracted state to a deployed state prior to receiving the visual data. In various embodiments, each latch assembly in the row of latch assemblies engages a cargo platform in the properly securing state. The method may further comprise comparing the visual data to a template prior to determining whether each latch assembly in the row of latch assemblies is in the acceptable restrained state.

A latch state detection system is disclosed herein. The latch state detection system may comprise: a camera configured to be aligned with a row of latch assemblies in a cargo handling system; a controller in operable communication with the camera, the controller operable to: receive visual data from the camera, the visual data including an image of the row of latch assemblies; and determine a state of the row of latch assemblies based on the visual data.

In various embodiments, the latch state detection system may further comprise the row of latch assemblies. The latch state detection system may further comprise a plurality of the camera and a plurality of the row of latch assemblies, wherein each camera in the plurality of the camera is aligned laterally with a respective row of latch assemblies in the plurality of the row of latch assemblies. The plurality of the row of latch assemblies may be spaced apart longitudinally in a cargo compartment of the cargo handling system. In various embodiments, each camera in the plurality of the camera is in operable communication with the controller. The controller may be operable to command each latch assembly in the row of latch assemblies to transition from a retracted state to a deployed state. The controller may be further operable to determine whether the state of the row of latch assemblies is acceptable during a loading process.

A method of loading a cargo compartment is disclosed herein. The method may comprise: transporting a first cargo to a first row of a cargo deck; transitioning a first row of latch assemblies from a retracted position to a deployed position, the deployed position configured to restrain the first cargo in a longitudinal direction; and determining, via a latch state detection system and through a camera aligned with the first row of latch assemblies, whether each latch assembly in the first row of latch assemblies is in a properly securing state.

In various embodiments, in response to determining a latch assembly in the first row of latch assemblies is not in the properly securing state, retracting the latch assembly and re-deploying the latch assembly. The method may further comprise transporting a second cargo to a second row of the cargo deck, the second row disposed adjacent to the first row, the first row of latch assemblies being restrained in a first lateral direction by the first row of latch assemblies. The method may further comprise transitioning a second row of latch assemblies from a second retracted position to a second deployed position, the second row of latch assemblies configured to restrain the second cargo in a second lateral direction, the second lateral direction opposite the first lateral direction. The method may further comprise determining through a second camera aligned with the second row of latch assemblies, whether each latch assembly in the second row of latch assemblies is in a second properly securing state. In various embodiments, transitioning the first row of latch assemblies is in response to a controller commanding the first row of latch assemblies to transition from the retracted position to the deployed position.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, fixed, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a latch state detection system for a cargo handling system. The latch state detection system is configured to detect a latch state (e.g., deployed or retracted) of a row of latch assemblies in the cargo handling system. The latch state detection system is a vision based latch detection system. In this regard, the latch detection system may utilize a camera to obtain visual data of the row of latch assemblies and determine whether each latch assembly in the plurality of latch assemblies is in an acceptable position to continue a loading or unloading process. In various embodiments, the controller may be configured to detect latch states which contain salient features (e.g., a tail end of a pawl extending above a latch housing). In various embodiments, the controller may be trained to detect the latch states via an image classifier implemented with a neural network. In various embodiments, the controller may compare the obtained visual data to a template image (e.g., a template search). In various embodiments, the latch detection system may employ a tailored pyramid method to reduce the complexity of the search and/or supply locations of a respective latch being examined.

In various embodiments, the latch detection system disclosed herein may reduce manual effort in loading and unloading cargo from a cargo compartment. For example, the latch detection system may indicate whether the latch assemblies are in proposer positioning without manual visual inspection, in accordance with various embodiments.

Figure 1A:
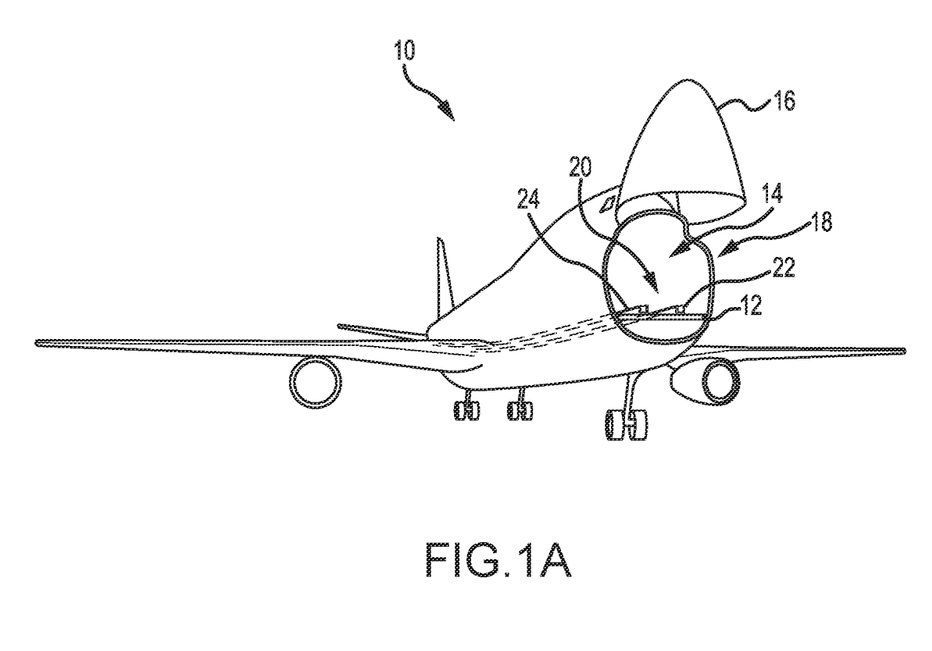
FIGS. 1A and 1B illustrate schematic views of a cargo handling system, in accordance with various embodiments.
Figure 1B:
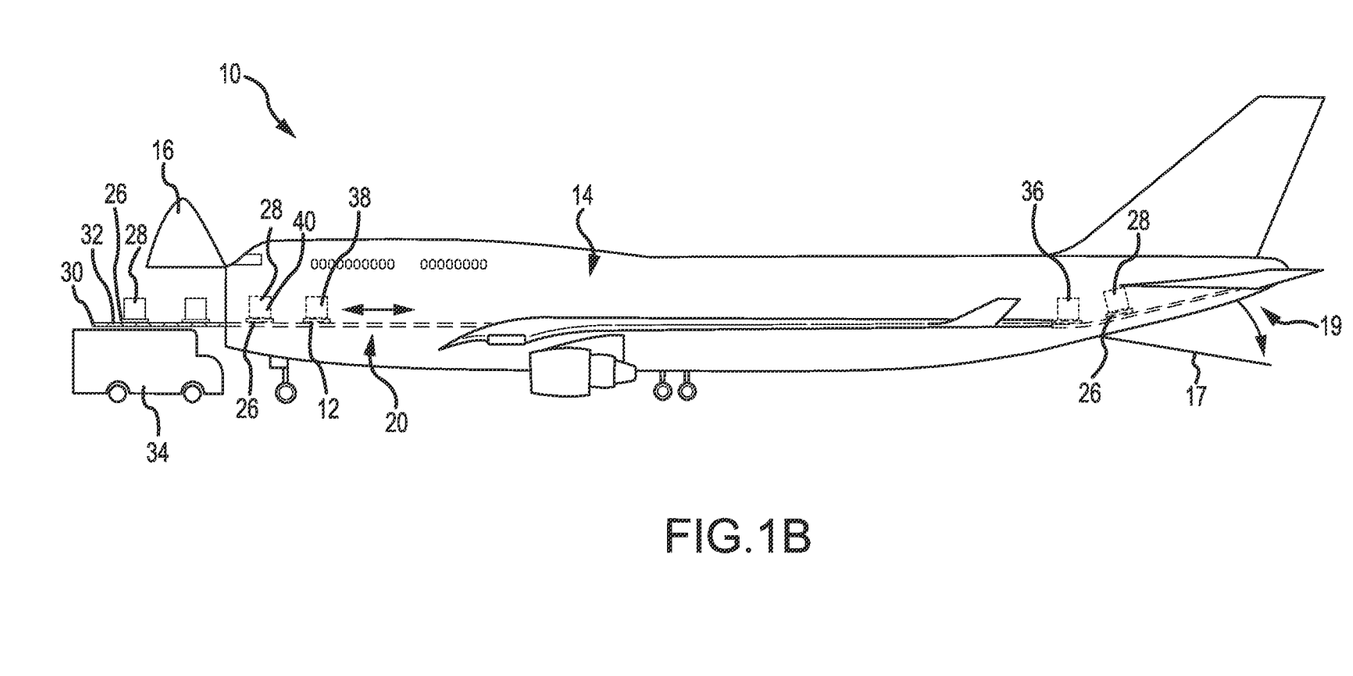

With reference to FIGS. 1A and 1B, a schematic view of an aircraft 10 having a cargo deck 12 located within a cargo compartment 14 is illustrated, in accordance with various embodiments. The aircraft 10 may comprise a cargo load door 16 located, for example, at a forward end of the aircraft 10 and configured to rotate upward (as illustrated in FIG. 1A) or sideways to expose an opening 18 that provides access to the cargo compartment 14. In various embodiments, a second cargo load door 17 may be located at other portions of the aircraft 10, such as, for example, at an aft end of the aircraft 10 and configured to rotate downward (as illustrated in FIG. 1B) and provide a second opening 19 to gain access to the cargo compartment 14. Inside the cargo compartment 14, one or more trays 20, e.g., a first tray 22 and a second tray 24, extend generally from the fore end of the aircraft 10 to the aft end of the aircraft 10. As described more fully below, the one or more trays 20 provide a support structure for which a platform 26 may transit along a length of the aircraft 10 between the fore end and the aft end and carry a ULD or some other form of cargo carrier, such as, for example, a container of a size typically used for ocean-going transport by ship or truck. Without loss of generality, a cargo load 28 of any size or shape, which may include objects within containers or ULDs or objects not within containers or ULDs, such as, for example, automobiles or the like, will be considered herein as configured for transport on the platform 26.

Still referring to FIGS. 1A and 1B, in various embodiments, the one or more trays 20, during loading or unloading of the cargo load 28, may be connected to a loading structure 30 which, in various embodiments, may comprise one or more trays 32 that correspond to the one or more trays 20 extending along the cargo deck 12 of the aircraft 10. In various embodiments, the loading structure 30 may be attached to an elevated structure, such as, for example, a truck 34 (as illustrated in FIG. 1B) or a scissor lift or a loading dock or the like, such that the one or more trays 20 and the loading structure 30 are located substantially at the same elevation and configured to transition a platform 26 either onto or off from the one or more trays 20. For example, a first cargo load 36 may be transitioned from the loading structure 30, through the opening 18 and onto the one or more trays 20, and then along the one or more trays 20 to the aft end of the aircraft, where the first cargo load 36 is secured for transport. This may be followed by a second cargo load 38, a third cargo load 40 and so on until the cargo deck 12 is filled to a desired capacity with cargo. After the aircraft 10 has reached its destination, each cargo load, such as, for example, the first cargo load 36, the second cargo load 38 and the third cargo load 40 are unloaded from the aircraft 10 in similar fashion, but in a reverse sequence to the loading procedure. To ensure cargo loads are restrained, the aircraft 10 may include a restraint assembly as described herein and in accordance with various embodiments.

Figure 2:
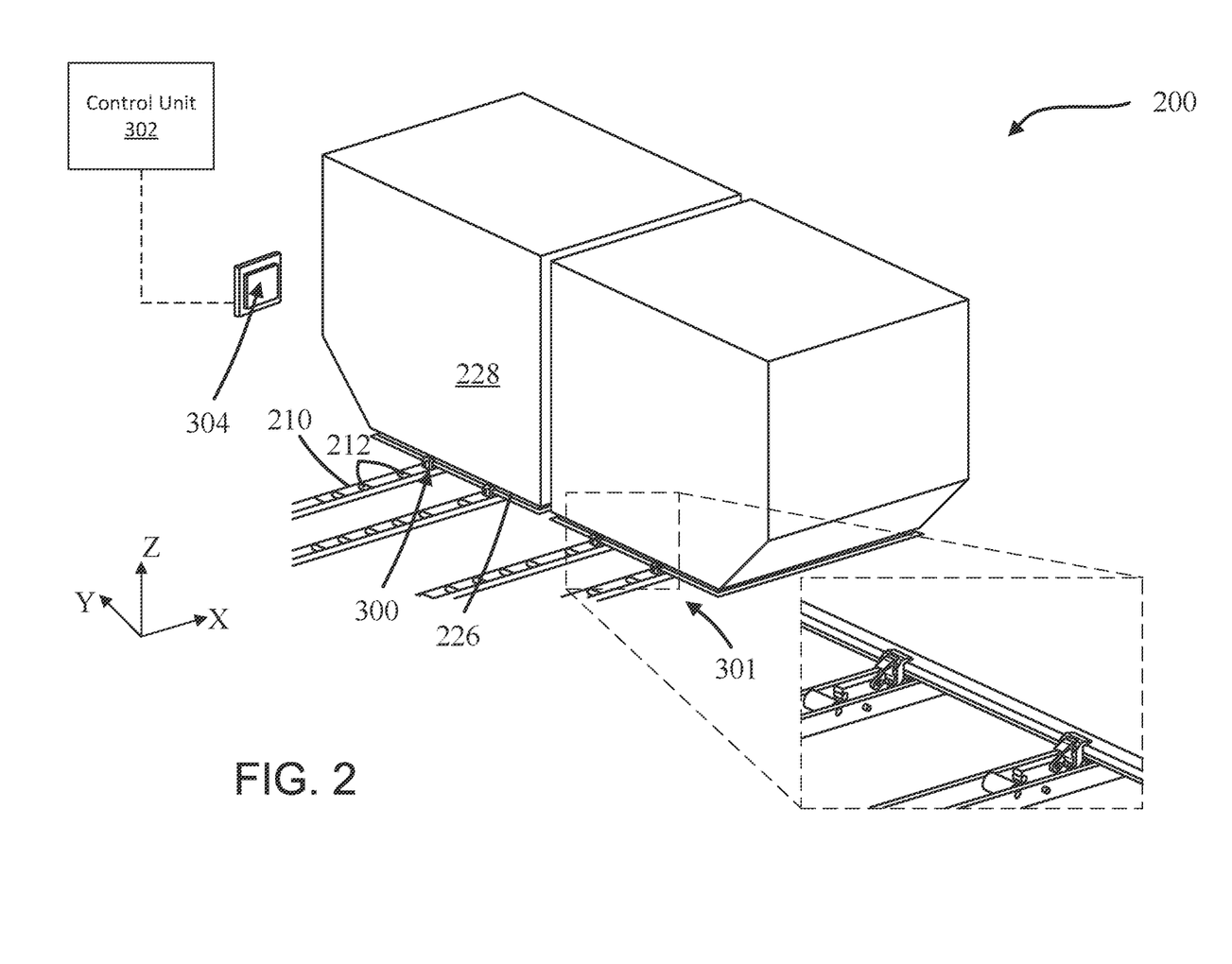
FIG. 2 illustrates a portion of a cargo handling system, in accordance with various embodiments.

Referring now to FIG. 2, a portion of a cargo handling system 200 is illustrated, in accordance with various embodiments. The cargo handling system 200 is illustrated with reference to an XYZ coordinate system, with the X-direction extending longitudinally in an aft direction (and defining a longitudinal direction), the Y-direction extending perpendicular to the X-direction (and defining a lateral direction) and the Z-direction extending vertically, each direction being with respect to an aircraft in which the cargo handling system 200 is positioned, such as, for example, the aircraft 10 described above with reference to FIGS. 1A and 1B.

In various embodiments, the cargo handling system 200 may define at least one tray 210 extending longitudinally in the aft direction (i.e., the X-direction). The tray 210 may include a plurality of rollers 212, each roller extending laterally from a first lateral side of the tray 210 to a second lateral side of the tray 210. In various embodiments, the cargo handling system 200 includes a platform 226 (or a plurality of platforms), such as, for example, the platform 26 described above with reference to FIGS. 1A and 1B. The platform 226 is configured to support a cargo load 228, which may include containerized or non-containerized cargo. As illustrated in FIG. 1B, in various embodiments, the tray 210 may include a substantially level surface throughout the length of the aircraft, though a portion of the tray 210 may be curved upward, particularly toward the aft end of the aircraft where the fuselage tends to curve upward at its base in order to facilitate takeoff and landing.

The cargo handling system 200 may further comprise a latch assembly 300, a cargo control unit 302, and a camera 304. The cargo control unit 302 may be in operable communication (i.e., electrical or wireless communication) with the latch assembly 300 and the camera 304. The latch assembly 300 may be configured to lock the platform 226 in place. For example, the control unit 302 may be configured to transition the latch assembly 300 from a locked position to an unlocked position, or vice versa.

The camera 304 may be aligned in a lateral direction (i.e., the Y-direction) across a cargo compartment 14 from FIGS. 1A and 1B and aligned with a row of latch assemblies 301, each latch assembly in accordance with the latch assembly 300. In this regard, the control unit 302 may be configured to receive an image of a row of latch assemblies from the camera 304 in a cargo compartment 14 from FIGS. 1A and 1B after the control unit 302 sends a signal to transition a row of latch assemblies 301. The camera 304 may take at least one image of the row of latch assemblies 301 and transmit the at least one image to the control unit 302 to determine whether each latch assembly 300 in the row of latch assemblies 301 is in a locked position as described further herein.

Figure 3:
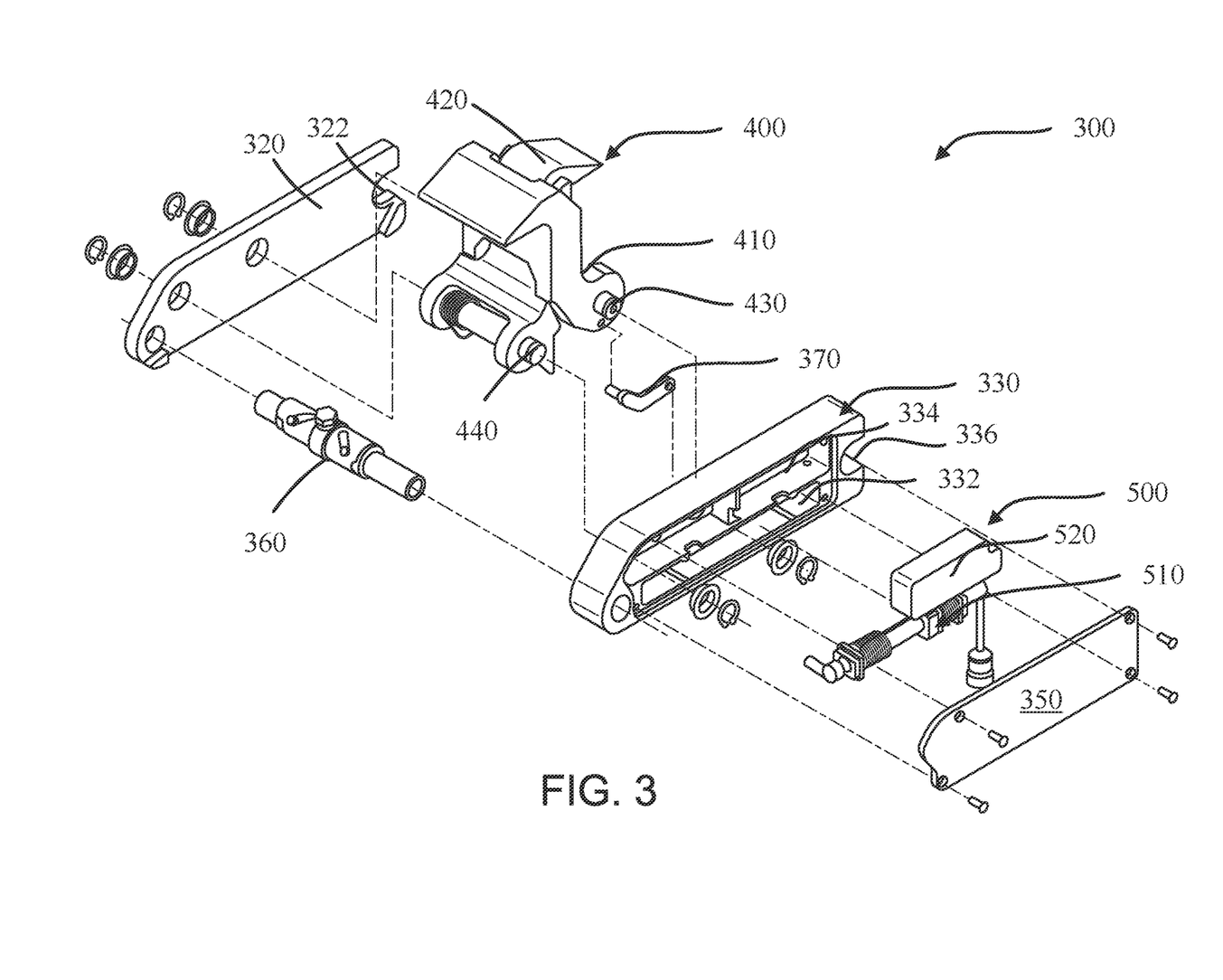
FIG. 3 illustrates an exploded view of a latch assembly, in accordance with various embodiments.

Referring now to FIG. 3, an exploded view of a latch assembly 300, in accordance with various embodiments, is illustrated. The latch assembly 300 comprises a pawl assembly 400, a side plate 320, a side housing 330, an actuator assembly 500, and a cover plate 350. The pawl assembly 400 is disposed between the side plate 320 and the side housing 330. The pawl assembly 400 includes an outer pawl 410, an inner pawl 420, an outer pawl shaft 430, and an inner pawl shaft 440. The outer pawl shaft 430 may be disposed through the outer pawl 410 and define an outer pawl axis of rotation. Similarly, the inner pawl shaft 440 may be disposed through the inner pawl 420 and define an inner pawl axis of rotation. The outer pawl shaft 430 and the inner pawl shaft 440 may be coupled to the side plate 320 and the side housing 330 by bushings and retaining rings, or any other method known in the art.

The actuator assembly 500 may be disposed in the side housing 330. The cover plate 350 may be configured to fully enclose the actuator assembly 500 within the side housing 330. In various embodiments, the side housing 330 comprises an actuator recess 332 and a control unit recess 334. The actuator recess 332 is configured to house the actuator 510 of the actuator assembly 500 and the control unit recess 334 is configured to house the control unit 520 of the actuator assembly 500. The actuator 510 may be configured to translate within the actuator recess 332 of side housing 330 and erect the pawl assembly 400 from a retracted state to a deployed state, or vice versa.

The latch assembly 300 may further comprise a locking pin assembly 360 disposed between the side plate 320 and the side housing 330. The locking pin assembly 360 is configured to couple the latch assembly 300 to the tray 210 from FIG. 2. In various embodiments, the side plate 320 may comprise an arcuate recess 322 and the side housing 330 may comprise an arcuate recess 336. The arcuate recess 322 and the arcuate recess 336 may be configured to interface with a retaining pin configured to restrain the latch assembly 300 longitudinally and rotationally on tray 210 from FIG. 2.

The latch assembly 300 may further comprise an outer pawl lever 370 operably coupled to the outer pawl 410 and the actuator assembly 500. In this regard, as the actuator 510 translates within the actuator recess 332, the outer pawl lever 370 may pivot the outer pawl 410 about the outer pawl axis of rotation defined by the outer pawl shaft 430. As such, the actuator assembly 500 may be configured to transition the pawl assembly 400 from a deployed state to a retracted state and vice versa. The actuator 510 may be in electronic communication with the control unit 520. For example, the control unit 304 (FIG. 2) may send a signal to the control unit 520 to deploy the pawl assembly 400. In response to receiving the signal, the control unit 520 may send an electrical current to the actuator 510 to deploy the pawl assembly 400. Similarly, the control unit 304 may send a signal to the control unit 520 to retract the pawl assembly 400. In response to receiving the signal, the control unit 520 may send an electrical current to the actuator 510 to retract the pawl assembly 400.

Figure 4:
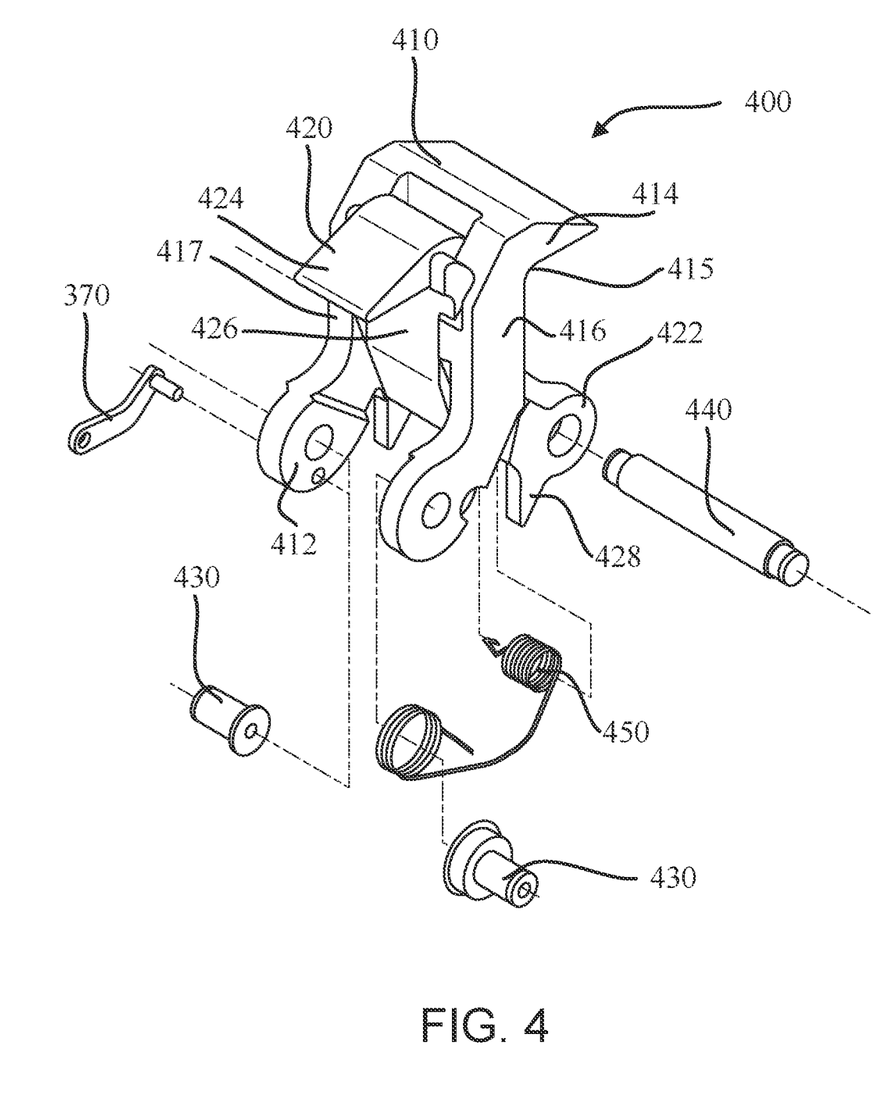
FIG. 4 illustrates an exploded view of a pawl assembly, in accordance with various embodiments.

Referring now to FIG. 4, a pawl assembly 400 is illustrated, in accordance with various embodiments. The pawl assembly 400 comprises the outer pawl 410, the inner pawl 420, the outer pawl shaft 430, and the inner pawl shaft 440. The outer pawl 410 may comprise a head end 412 and a tail end 414. The head end 412 is coupled to the side plate 320 and the side housing 330 from FIG. 3 by the outer pawl shaft 430. The tail end 414 of the outer pawl 410 may define a shoulder 415 configured to interface with a platform 226 from FIG. 2 and/or secure the platform 226 in place for transit. Similarly, the inner pawl 420 may comprise a head portion 422 and a tail end 424. The head portion 422 is coupled to the side plate 320 and the side housing 330 from FIG. 3 by the inner pawl shaft 440. The tail end 424 of the inner pawl 420 may be vertically spaced apart from the head end 412 of the outer pawl 410 when the pawl assembly 400 is in a deployed state. Similarly, the tail end 414 of the outer pawl 410 may be spaced apart vertically from the head portion 422 of the inner pawl 420.

In various embodiments, the inner pawl 420 further comprises an elongated portion 426 disposed between the head portion 422 and the tail end 424. Similarly, the outer pawl 410 further comprises a first side elongated portion 416 and a second side elongated portion 417 disposed between the head end 412 and the tail end 414. The elongated portion 426 of the inner pawl 420 may be disposed between the first side elongated portion 416 and the second side elongated portion 417 of the outer pawl 410. In various embodiments, the inner pawl 420 may further comprise a protrusion 428 extending vertically away from the tail end 414 of the outer pawl 410 when the pawl assembly 400 is in a deployed state. In various embodiments, the actuator 510 described further herein is configured to contact the protrusion in response to transitioning from an retracted state to a deployed state, causing the inner pawl 420 to rotate about an axis defined by inner pawl shaft 440 and transition the pawl assembly 400 to the deployed state. In this regard, the actuator 510 may comprise a portion extending through the housing 330 and the portion is configured to engage the protrusion 428 during operation.

In various embodiments, the pawl assembly 400 further comprises a spring 450. The spring 450 may be coupled to the outer pawl 410 via outer pawl shaft 430. Similarly, the spring 450 may be coupled to the inner pawl 420 via inner pawl shaft 440. The spring 450 may be configured to bias the pawl assembly 400 in a retracted position, in accordance with various embodiments.

Figure 5A:
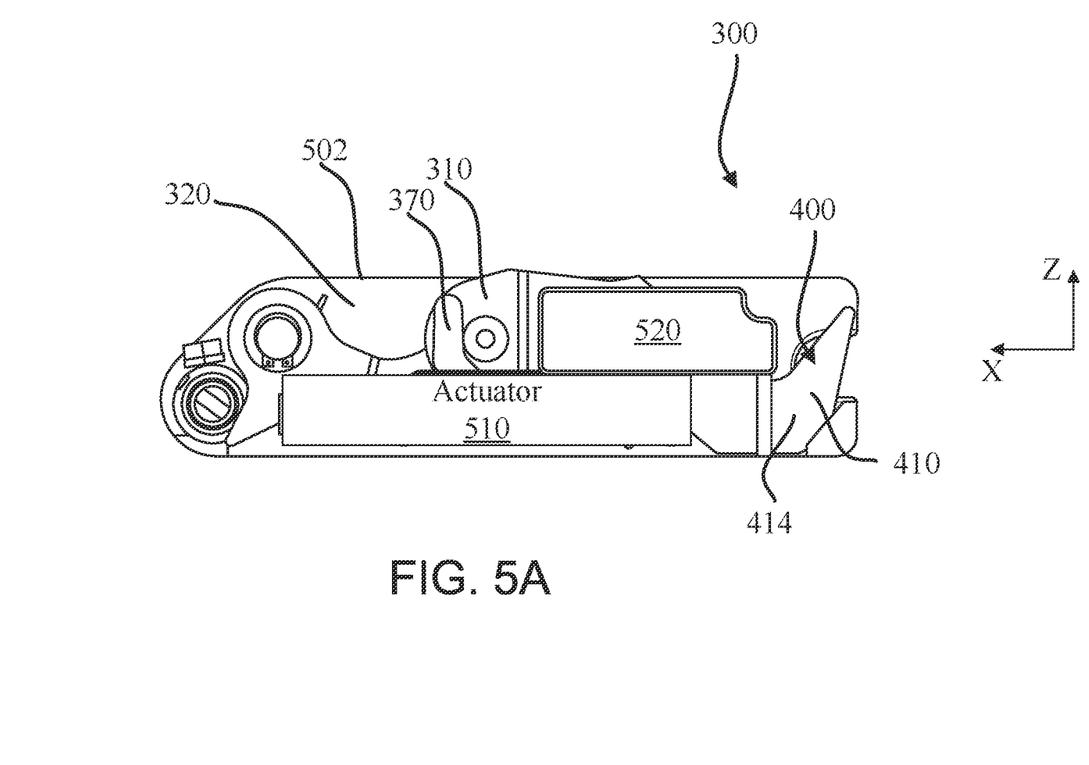
FIG. 5A illustrates a side view of a latch assembly in a retracted state with the cover plate and side housing removed, in accordance with various embodiments.

Referring now to FIG. 5A, a side view of a latch assembly 300 in a retracted state with the cover plate 350 and side housing 330 removed for clarity, is illustrated, in accordance with various embodiments. When the latch assembly 300 is in a retracted state, the tail end 414 of the outer pawl 410 is vertically below a plane defined by a top surface 502 of the side plate 320. Similarly, the tail end 424 of the inner pawl 420 is vertically below the plane defined by the top surface 502. In this regard, in a retracted state, the latch assembly 300 is configured to allow cargo to roll over the latch assembly 300 without contacting, or hindering, movement of the cargo (i.e., as illustrated in FIG. 1A).

In various embodiments, the actuator assembly 500 of the latch assembly 300 comprises an actuator 510 in operable communication with the control unit 520 of the latch assembly 300. The actuator 510 is configured to is configured to transition the latch assembly 300 from a retracted state to a deployed state and vice versa in response to receiving a signal from the control unit 520. Thus, any type of actuator with an electrical input is within the scope of this disclosure, such as an electro-mechanical actuator, a hydraulic actuator with an electrically controlled pump, or the like. Although illustrated as comprising a local control unit (e.g., control unit 520), the present disclosure is not limited in this regard. For example, the actuator 510 may receive instructions directly from a master control unit (e.g., control unit 302 from FIG. 2), in accordance with various embodiments.

Figure 5B:
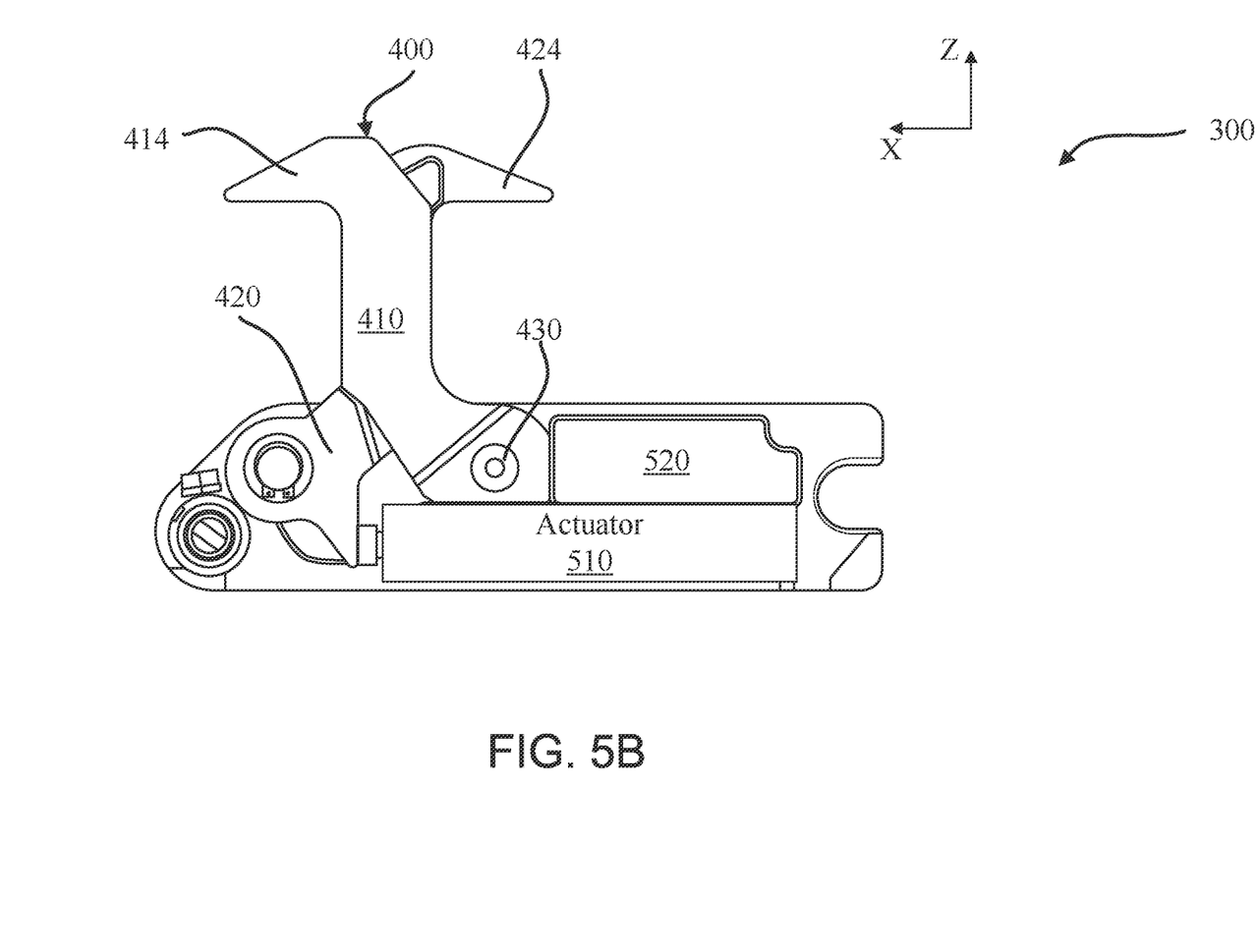
FIG. 5B illustrates a side view of a latch assembly in a deployed state with the cover plate and side housing removed, in accordance with various embodiments.

Referring now to FIG. 5B, a side view of the latch assembly 300 in a deployed state with the cover plate 350 and side housing 330 removed for clarity is illustrated in accordance with various embodiments. When the latch assembly 300 is in a deployed state, the tail end 414 of the outer pawl 410 extends in a first longitudinal direction and the tail end 424 of the inner pawl 420 extends in a second longitudinal direction and both tail ends 414, 424 are disposed vertically above the top surface 502 of the side plate 320 in accordance with various embodiments. In this regard, in response to actuation from a retracted state to a deployed state, one of the outer pawl 410 and the inner pawl 420 engages a platform 226 from FIG. 2) and secures the platform 226 in place and the remaining pawl (e.g., inner pawl 420 or outer pawl 410) is aligned to receive, and secure, an adjacent platform 226 in a longitudinal direction (i.e., the X-direction), in accordance with various embodiments.

In various embodiments, a deployed state is in a "properly securing state" when outer pawl 410 and inner pawl 420 are both properly engaged to a respective platform 226 from FIG. 2 (i.e., outer pawl 410 properly engages a first platform and inner pawl 420 properly engages a second platform), in accordance with various embodiments. In various embodiments, the properly securing state may be tested twice for a row of latches (i.e., once when the outer pawl 410 engages a first platform and a second time when the inner pawl engages a second platform). In various embodiments, the properly securing state is tested only once for a row of latches (i.e., when both the outer pawl 410 and the inner pawl 420 are engaging a respective platform). The "properly securing state" may be a pre-determined state (i.e. a predetermine amount of vertical restrain (e.g., an acceptable vertical gap between outer pawl 410 and a mating flange of the platform 226, an acceptable horizontal gap between inner pawl 420 and the mating flange, etc.).

Figure 6:
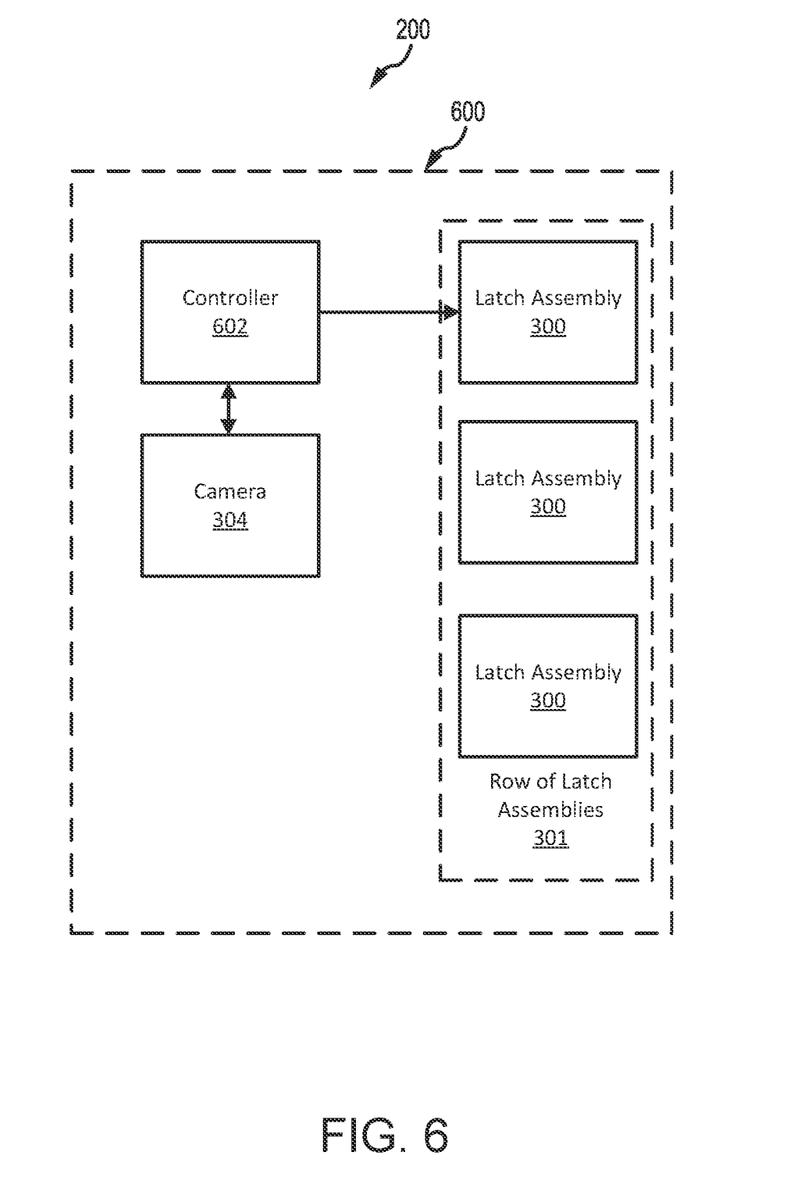
FIG. 6 illustrates a latch state detection system for a cargo handling system, in accordance with various embodiments.

With reference now to FIG. 6, a schematic block diagram of a latch state detection system 600 for a row of latch assemblies 301 of a cargo handling system 200 is illustrated, in accordance with various embodiments. Latch state detection system 600 includes a controller 602 in electronic communication with each latch assembly 300 in the row of latch assemblies 301. In various embodiments, controller 602 may be integrated into a computer system, such as cargo control unit 302 from FIG. 2. In various embodiments, controller 602 may be configured as a central network element or hub to access various systems and components of latch state detection system 600. Controller 602 may comprise a network, computer-based system, and/or software components configured to provide an access point to various systems and components of latch state detection system 600. In various embodiments, controller 602 may comprise a processor. In various embodiments, controller 602 may be implemented in a single processor. In various embodiments, controller 602 may be implemented as and may include one or more processors and/or one or more tangible, non-transitory memories and be capable of implementing logic. Each processor can be a general purpose processor, a digital signal processor (DSP), an application specific integrated circuit (ASIC), a field programable gate array (FPGA) or other programable logic device, discrete gate or transistor logic, discrete hardware components, or any combination thereof. Controller 602 may comprise a processor configured to implement various logical operations in response to execution of instructions, for example, instructions stored on a non-transitory, tangible, computer-readable medium configured to communicate with controller 602.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, controller 602 may be in operable (e.g., electrical or wireless) communication with each latch assembly 300 in the row of latch assemblies 301 and a camera 304 aligned as described with respect to FIG. 2 (i.e., laterally along the row of latch assemblies). For example, controller 602 may be configured to transmit a signal to an actuator 510 from FIGS. 5A and 5B directly, or through a local controller (e.g., control unit 520), and the actuator 510 may actuate its corresponding latch assembly 300 in the row of latch assemblies 301 in response to receiving the signal.

Although illustrated for a single row of latch assemblies 301, the present disclosure is not limited in this regard. For example, with brief reference to FIGS. 1B and 2, a plurality of rows of latch assemblies 301 may be spaced apart longitudinally (e.g., in the X-direction) through the cargo compartment 14 of the cargo handling. Thus, during loading, a first row of cargo may be transported to a back row of the cargo compartment 14 and restrained at least partially by a row of latch assemblies 301. Then, once the first row of cargo is in place and properly securing, a second row of cargo may be transported to a second row that is adjacent to the back row, and so on and so forth until the cargo compartment 14 is completely filled, in accordance with various embodiments. Thus, the latch state detection system 600 may comprise a camera 304 and a corresponding row of latch assemblies 301 aligned in view of the camera 304 for each row of latch assemblies 301 in a cargo handling system 200, in accordance with various embodiments.

In various embodiments, the controller 602 may be a single master controller for the cargo handling system 200 (e.g., control unit 302) or the controller 602 may be a local controller corresponding to a respective row of latch assemblies 301. The present disclosure is not limited in this regard.

Figure 7:
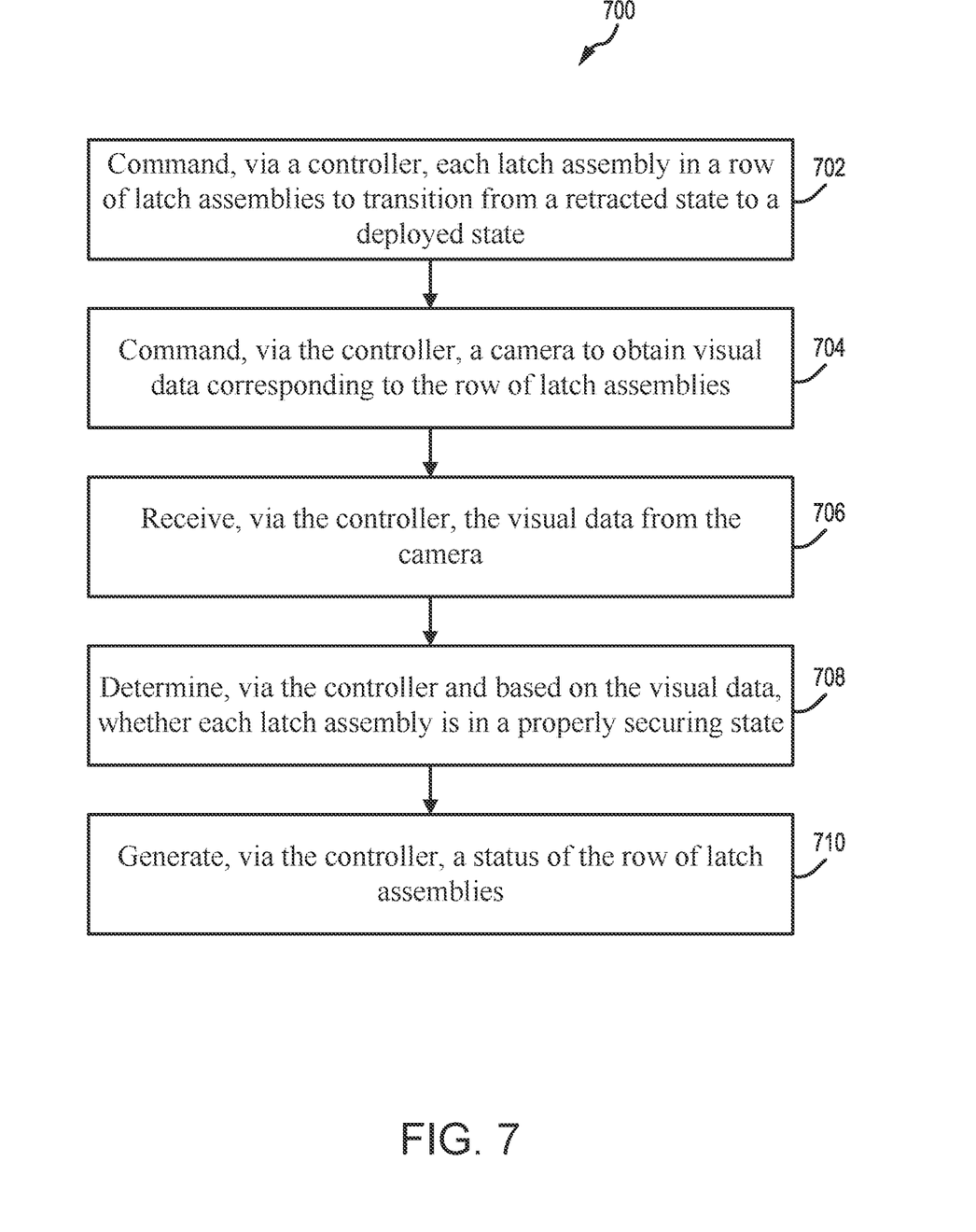
FIG. 7 illustrates a process for using the latch detection system of FIG. 6 in accordance with various embodiments.

Referring now to FIG. 7, a process 700 for using the latch state detection system 600 from FIG. 6 is illustrated, in accordance with various embodiments. With combined reference to FIGS. 6 and 7, the process 700 comprises commanding, via the controller 602, each latch assembly 300 in a row of latch assemblies 301 to transition from a retracted state to a deployed state (step 702). The command may occur in response to a row of cargo being transported adjacent to the row of latch assemblies 301. In this regard, the row of latch assemblies 301 are commanded to transition from the retracted state to the deployed state to secure the cargo during a loading process as described previously herein.

In various embodiments, the process 700 further comprises commanding, via the controller 602, the camera 304 to obtain visual data corresponding to the row of latch assemblies 301 (step 704). In various embodiments, step 704 occurs subsequently from step 702. In this regard, the visual data from step 704 may be used to verify whether each latch assembly 300 in the row of latch assemblies 301 is properly securing and/or properly securing a respective cargo, in accordance with various embodiments. In various embodiments, the visual data may comprise a video, an image, a plurality of images, or the like.

In various embodiments, the process 700 further comprises, receiving, via the controller 602, the visual data from the camera 304 (step 706) and determining, via the controller 602 and based on the visual data, whether each latch assembly 300 in the row of latch assemblies 301 is in a properly securing state (step 708). In various embodiments, the determining step (e.g., step 708) may be performed via a template method (e.g., by scanning the row of latch assemblies 301 and comparing the row of latch assemblies 301 to a template of the row of latch assemblies 301 in a deployed state), an artificial neural network (DNN) method (e.g., machine learning where the controller 602 is configured to detect both a deployed state and a retracted state), or the like. In various embodiments, the determining step (e.g., step 708) utilizes a pyramid search (i.e., focus the visual data to a first resolution where each latch assembly 300 in the plurality of latch assemblies in a common row of latch assemblies 301 is located, where the first resolution is the same as a second resolution from the template for the template method or a third resolution from training the controller 602 for the DNN method).

In various embodiments, the process 700 further comprises, generating, via the controller 602, a status of the row of latch assemblies 301 (step 710). In various embodiments, the status may be generated to a display device, such as a monitor of the system, an indicator, or the like. In various embodiments, the status may indicate that all of the latch assemblies 300 in the row of latch assemblies 301 are in a properly securing state, some of the latch assemblies 300 in the row of latch assemblies 301 are in a properly securing state, or none of the latch assemblies 300 in the row of latch assemblies 301 are in a properly securing state. In various embodiments, the status may simply indicate whether all of the latch assemblies 300 in the row of latch assemblies 301 are in a properly securing state or not (i.e., an indication whether the cargo loading process may be continued or should be stopped and reviewed prior to continuing). In various embodiments, the status may include which, if any, of the latch assemblies 300 in the row of latch assemblies 301 are in an unacceptable state (e.g., a retracted state or a partially extracted state).

Figure 8:
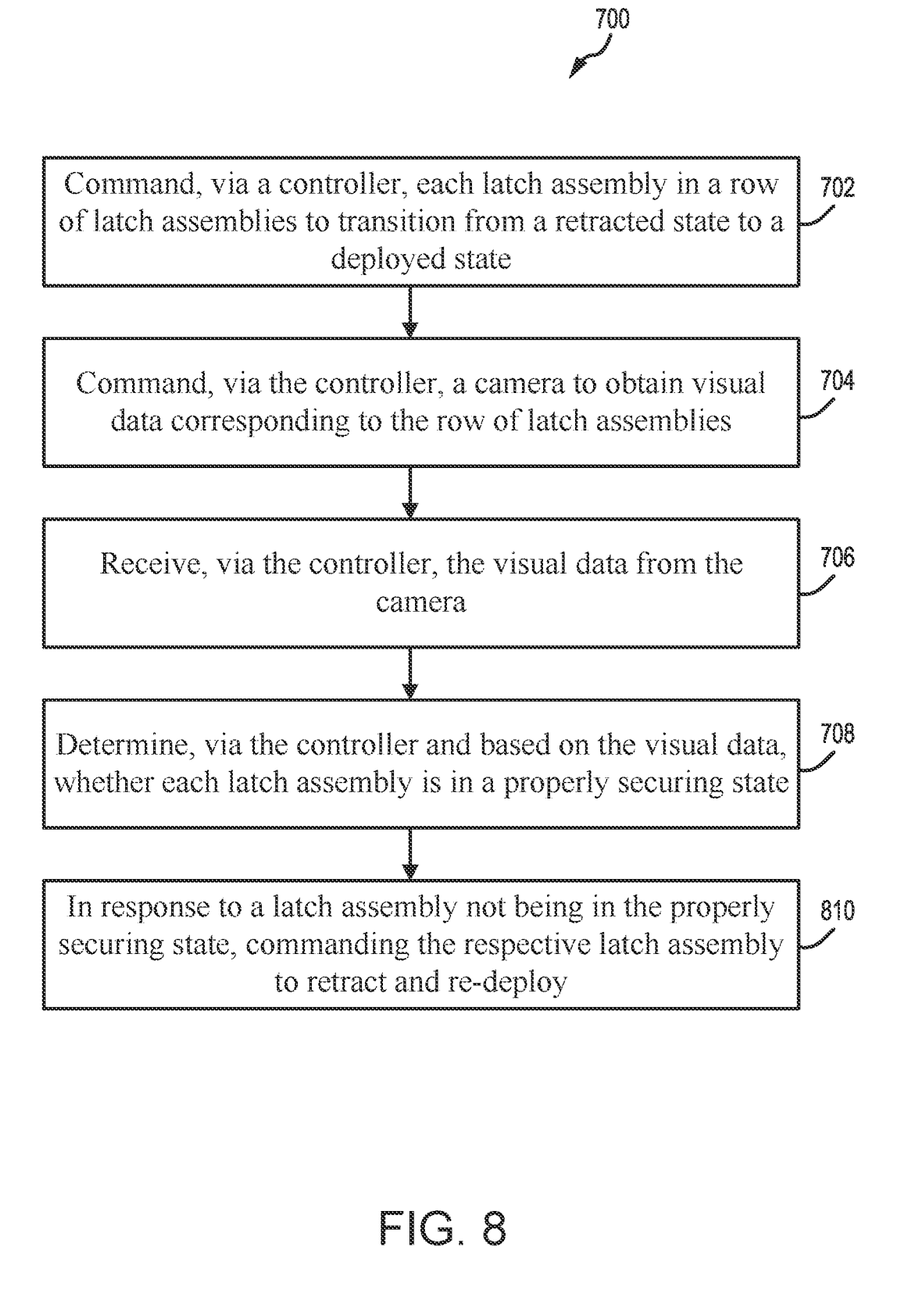
FIG. 8 illustrates a process for using the latch detection system of FIG. 6 in accordance with various embodiments.

In various embodiments, information from determining whether each latch assembly 300 is in the properly securing state may be utilized to reset a latch assembly 300 that is not in the properly securing state. For example, with reference to FIG. 8, the process 700 may further comprise commanding a latch assembly 300 that is not in the properly securing state to retract and re-deploy in response to determining the latch assembly 300 was not in the properly securing state (step 810). In this regard, step 810 may be performed immediately following the determining step 708 when one or more latch assemblies 300 is not in the properly securing state. In various embodiments, step 708 may be repeated after step 810 and a status may be generated in accordance with step 710 from FIG. 7 after step 810.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method, comprising:
    receiving, by a controller and through a camera, visual data corresponding to a row of latch assemblies in a cargo handling system;
    comparing the visual data to a template of the row of latch assemblies in a deployed state, wherein the visual data is focused to a first resolution that is a same resolution as a second resolution of the template, wherein in the deployed state a first latch assembly in the row of latch assemblies is configured to restrain a cargo platform associated with the cargo handling system;
    determining, by the controller, whether each latch assembly in the row of latch assemblies is in the deployed state; and
    responsive to determining that the first latch assembly in the row of latch assemblies is not in the deployed state, automatically commanding, by the controller, the first latch assembly to retract and deploy to the deployed state.

2. The method of claim 1, further comprising generating, via the controller, a status of the row of latch assemblies.

3. The method of claim 2, wherein the status is either acceptable or unacceptable.

4. The method of claim 1, further comprising commanding each latch assembly in the row of latch assemblies to transition from a retracted state to the deployed state prior to receiving the visual data.

5. The method of claim 1, wherein each latch assembly in the row of latch assemblies engages one of a plurality of cargo platforms in the deployed state, the plurality of cargo platforms including the cargo platform.

6. A latch state detection system, comprising:
    a camera configured to be aligned with a row of latch assemblies in a cargo handling system;
    a controller in operable communication with the camera, the controller operable to:
        receive visual data from the camera, the visual data including an image of the row of latch assemblies;
        compare the visual data to a template of the row of latch assemblies in a deployed state to form a comparison, wherein the visual data is focused to a first resolution that is a same resolution as a second resolution of the template, wherein in the deployed state a first latch assembly in the row of latch assemblies is configured to restrain a cargo platform associated with the cargo handling system;
        determine a state of the row of latch assemblies based on the comparison; and
        responsive to determining that the state of the first latch assembly in the row of latch assemblies is not in the deployed state, automatically commanding the first latch assembly to retract and deploy to the deployed state.

7. The latch state detection system of claim 6, further comprising the row of latch assemblies.

8. The latch state detection system of claim 7, further comprising a plurality of the camera and a plurality of the row of latch assemblies, wherein each of the plurality of the camera is aligned laterally with one of the plurality of the row of latch assemblies.

9. The latch state detection system of claim 8, wherein the plurality of the row of latch assemblies are spaced apart longitudinally in a cargo compartment of the cargo handling system.

10. The latch state detection system of claim 8, wherein each of the plurality of the camera is in operable communication with the controller.

11. The latch state detection system of claim 6, wherein the controller is operable to command each latch assembly in the row of latch assemblies to transition from a retracted state to the deployed state.

12. The latch state detection system of claim 11, wherein the controller is further operable to determine whether the state of the row of latch assemblies is acceptable during a loading process.

13. A method of loading a cargo compartment, the method comprising:
    transporting a first cargo to a first row of a cargo deck;
    transitioning a first row of latch assemblies from a retracted state to a deployed state, the deployed state configured to restrain the first cargo in a longitudinal direction;
    comparing, by a latch state detection system, visual data to a template of the first row of latch assemblies in the deployed state, wherein the visual data is focused to a first resolution that is a same resolution as a second resolution of the template, wherein in the deployed state a first latch assembly in the first row of latch assemblies is configured to restrain the first cargo in the cargo compartment;
    determining, by the latch state detection system and through a camera aligned with the first row of latch assemblies, whether each latch assembly in the first row of latch assemblies is in a properly securing state; and
    responsive to determining that a state of the first latch assembly in the first row of latch assemblies is not in the deployed state, automatically commanding, by the latch state detection system, the first latch assembly to retract and deploy to the deployed state.

14. The method of claim 13, further comprising transporting a second cargo to a second row of the cargo deck, the second row disposed adjacent to the first row, the first row of latch assemblies being restrained in a first lateral direction by the first row of latch assemblies.

15. The method of claim 14, further comprising transitioning each latch assembly in a second row of latch assemblies from the retracted state to the deployed state, the second row of latch assemblies configured to restrain the second cargo in a second lateral direction, the second lateral direction opposite the first lateral direction.

16. The method of claim 15, further comprising determining through a second camera aligned with the second row of latch assemblies, whether each latch assembly in the second row of latch assemblies is in the deployed state.

17. The method of claim 13, wherein transitioning the first row of latch assemblies is in response to a controller commanding the first row of latch assemblies to transition from the retracted state to the deployed state.

* * * * *